Patented Mar. 24, 1925.

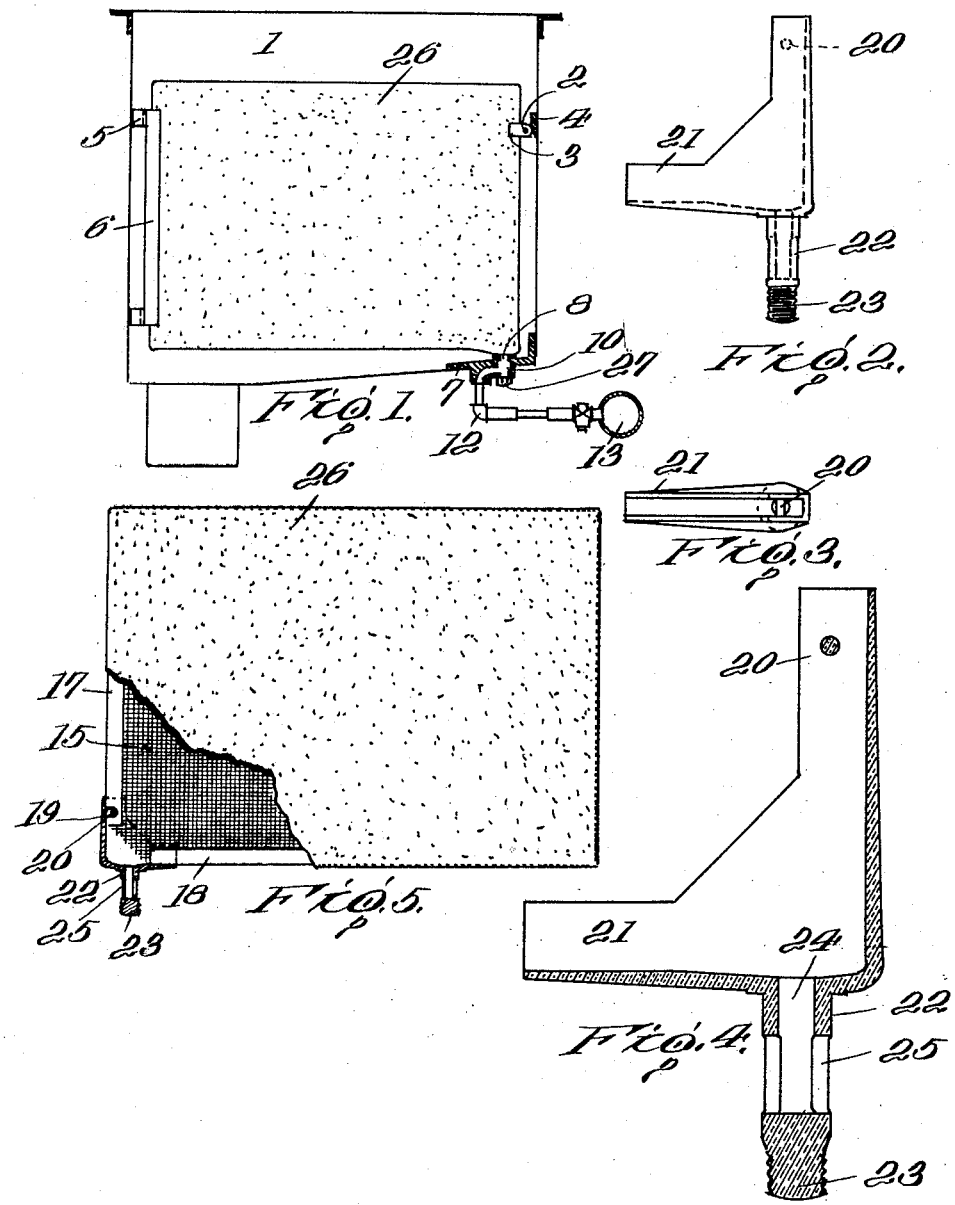

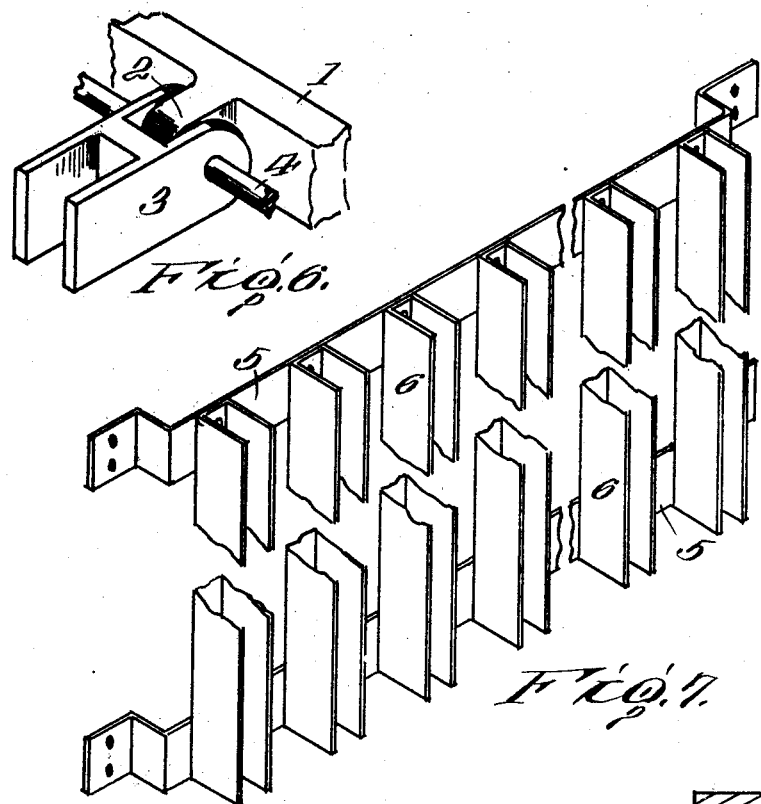
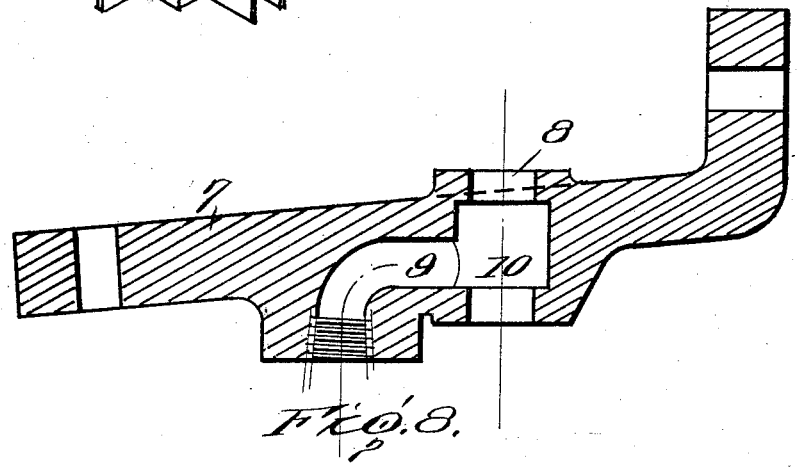

1,531,095

UNITED STATES PATENT OFFICE.

WERNER HOEHN, OF NEW ORLEANS, LOUISIANA.

FILTER LEAF.

Application filed February 14, 1922. Serial No. 536,488.

*To all whom it may concern:*

Be it known that I, WERNER HOEHN, of New Orleans, in the parish of Orleans and State of Louisiana, have invented certain new and useful Improvements in Filter Leaves; and I do hereby declare the following to be a full, clear, and exact description of the invention, such as will enable others skilled in the art to which it appertains to make and use the same.

My invention relates to the filtering of fluids and particularly to that type of filtering apparatus which includes a tank with filtering leaves arranged therein in spaced relation, the solid matter of the material accumulating on these leaves in the process of filtering by means of a vacuum, such caked material being visible and easily removed in situ from the filter at appropriate periods, and the leaves themselves being adapted for removal if occasion requires, either for exchange of filter cloth or repair purposes.

The object of my invention is to provide a simple and improved filter leaf wherein a greater filtering surface is obtained than in known structures and which will permit of rapid exchange of filter cloths, the leaf as a whole being without complicated parts and readily produced at low cost.

In the drawings, Figure 1 is an elevation showing a tank in outline with one of my improved filter leaves supported therein. Figure 2 is a view in side elevation of a filter leaf shoe. Figure 3 is a top plan view of the shoe shown in Figure 2. Figure 4 is an enlarged sectional view of the filter shoe. Figure 5 is an elevation of a filter leaf with the bag partly broken away to show the screen with the fitted shoe. Figures 6 and 7 are details, in perspective, of the spacers used and guides, respectively, for maintaining the filter leaves in position in the tank. Figure 8 is a sectional view of the header with which the leaves are connected.

The improved filter leaf shown in the drawings is adapted for use in connection with the filtering of sucrose liquors, but may be used with success in the filtration of other fluids. 1 indicates a tank having at one side a series of spaced apart projections 2 to which approximately H-shaped spacers 3 are pivotally secured by a shaft 4 extending lengthwise of the frame and through all of the projections 2 and spacers 3. At the opposite side of the tank is a rack 5 with U-shaped guiding members 6 secured thereto, these members being complementary to the spacers 3 and with them forming a means for holding the filter leaves in spaced arrangement in the tank. Extending lengthwise of the tank and in part forming the bottom thereof is a header 7. This header has a plurality of bores 8 extending therethrough and a passageway 9 leads from an enlarged central part 10 of the bore, this passageway forming communication with a valved lead 12 from a manifold 13. In order to provide a suitable backing for the support of the filter medium I preferably employ a wire screen 15 suitably framed by a reinforcing band which extends along the sides and the three right angular corners of the screen. The ends 17 and 18 of the band terminate short of the plane of each other so as to leave a portion of the screen exposed, the screen itself being cut off on a bias at such point in order that a better drain for the clear filtrate may be provided. The band near its end 17 has a notch 19 adapted for engagement with a pin 20 of the filter shoe 21. The filter shoe is of channel shape in cross section with a horizontally disposed base portion and an upwardly extending end, and this channelled member with the screen 15 seated therein forms a right angular corner for the exposed portion of the screen, being a continuation of the frame. The shoe has a neck 22 the extreme end 23 of which is screw threaded, a bore 24 extending part way down the neck and into communication with a transverse slot 25. The filter bag 26 encompasses the framed screen and all that portion of the shoe above the neck 22, such bag being fastened to the neck so that the connection shall be leak-proof.

In assembling a leaf the framed screen 15 is fitted to the channeled portion of the shoe, these two parts being held by the engagement between the pin 20 and notched portion 19 of the band, and a filter bag is then placed over the parts, the open end through which the screen and shoe are introduced being sewed or otherwise fastened so as to completely close it. The neck 22 of the shoe protrudes through a small opening in the bag and appropriate connection is made between such neck and the bag fabric. The filter leaf is now ready to be inserted in the filter tank and this is readily accomplished by placing it within one of the U-shaped guiding members 6 of the rack 5, the neck 22 being inserted in one of the bores 8 of the header 7, the screw threaded end of the neck projecting out through the header where it is fastened by a cap nut 27, the tightening of which firmly seats the shoe. The transverse slot 25 of the neck is thus brought into alinement with the central part 10 of the bore 8 of the header and communication is established with the manifold 13 through the passageway 9 and the lead 12.

The advantages of my invention will be apparent to those skilled in the art. It will be noticed that I have produced an extremely simple filtering leaf which is so constructed that a maximum filtering surface is provided and that the parts constituting such leaf are easily separated for cleansing purposes. And it is further to be observed that the screen and its supporting shoe are readily detachable so that the shoe may be used with another screen if necessary, a further advantage of such detachment being the ease of access for cleaning. By placing the filtrate exit of the filter leaves at their lowest point the filtering process is largely aided by the gravitation of the clear filtrate to that point.

I claim as my invention:

1. In a filtering apparatus including a tank, and a header in said tank having a series of openings therethrough and passageways communicating with said openings, filter leaves supported in spaced relation in said tank each comprising a framed screen having a detachable member forming part of said frame, a fabric covering for said frame, and a connection between the detachable member of said frame and said header forming a filtrate exit for said leaf.

2. In a filtering apparatus including a tank, and a header in said tank extending lengthwise thereof having a series of openings therethrough and passageways communicating with said openings, filter leaves supported in spaced relation in said tank each comprising a shoe, a frame detachably secured to said shoe, a connection between said shoe and said header communicating with a passageway of the latter, said connection forming a filtrate exit for said leaf and a fabric enveloping said shoe and said frame.

3. In a filtering apparatus including a tank, and a header in said tank extending lengthwise thereof having a series of openings therethrough and passageways communicating with said openings, filter leaves supported in spaced relation in said tank each comprising a shoe having an opening therethrough, a framed screen detachably secured to said shoe, means for automatically fastening the shoe and frame together on the application of the shoe to the frame, a connection between said shoe and said header forming a communication between the opening of the shoe and the passageway of the header, and a fabric covering for said shoe and said frame.

4. A filter leaf comprising a screen, a frame extending part way around said screen, a shoe detachably connected to the frame and forming a continuation thereof, said shoe being provided with a filtrate exit for the leaf and means for automatically fastening the frame and shoe together on the application of the shoe to the frame.

5. In a filtering apparatus including a tank, and a header in said tank having a series of openings therethrough and passageways communicating with said openings, filter leaves supported in spaced relation in said tank each comprising a screen, a frame extending part way round said screen, a channel-shaped detachable member forming a continuation of said frame, means on the member for detachably fastening the member and frame together, said member having a depending portion adapted to fit within one of the openings of said header and being itself bored, and a fabric enclosing said frame and through which said depending portion extends, the bore of said depending portion communicating with a passageway of said header.

6. In a filtering apparatus including a tank, and a header in said tank having a series of openings therethrough and passageways communicating with said openings, filter leaves supported in spaced relation in said tank each comprising a screen, a frame extending part way round said screen, one of the ends of said frame having a notch, a channel-shaped detachable member forming a continuation of said frame, a transverse pin on said detachable portion adapted for engagement with the notched end of said frame, said member having a depending portion adapted to fit within one of the openings of said header and being itself bored, a fabric enclosing said frame and through which said depending portion extends, the bore of such depending portion communicating with a passageway of said header, and means for rigidly fastening said depending portion to said header.

7. A filter leaf comprising a screen, a frame extending part way around said screen, an end of said frame having a notch, a detachable shoe engaging and forming a continuation of said frame, said shoe being provided with a filtrate exit for the leaf and means on the shoe for engaging the notch of the frame for fastening the frame and shoe together.

In testimony whereof I have signed this specification.

WERNER HOEHN.